United States Patent [19]

Higashi

[11] Patent Number: 5,346,293
[45] Date of Patent: Sep. 13, 1994

[54] METHOD FOR ANTI-SKID BRAKE CONTROL

[75] Inventor: Katsumi Higashi, Higashimatsuyama, Japan

[73] Assignee: Jidosha Kiki Co., Ltd., Tokyo, Japan

[21] Appl. No.: 83,522

[22] Filed: Jun. 30, 1993

[30] Foreign Application Priority Data

Jul. 17, 1992 [JP] Japan .................. 4-190653

[51] Int. Cl.$^5$ .............................. B60T 8/32
[52] U.S. Cl. ..................... 303/92; 303/103
[58] Field of Search ............. 303/103, 102, 100, 105, 303/106, 107, 108, 109, 110, 111, 92; 188/181 A, 181 R; 364/426.01, 426.02, 426.03

[56] References Cited

U.S. PATENT DOCUMENTS

5,178,440 1/1993 Yagi et al. ................... 303/102

Primary Examiner—Douglas C. Butler
Attorney, Agent, or Firm—Varndell Legal Group

[57] ABSTRACT

In the method for anti-skid brake control according to the present invention, start-up wheel speed (Vis) rapidly increasing from zero (0), when a vehicle is started is detected by a wheel speed sensor (8). When the start-up wheel speed (Vis) is higher than a first reference speed (Va), which is higher than lower limit speed of anti-skid brake control, and is lower than a second-reference speed (Vb), it is switched over to "select high" control when the start-up wheel speed (Vis) is on front wheel side, and the lower limit wheel speed ($V_L$) of anti-skid brake control is set to the start-up wheel speed (Vis) when it is on rear wheel side. If the start-up wheel speed (Vis) is higher than the second reference speed (Vb), anti-skid brake control is prohibited for both front and rear wheel sides, and alarm lamp is lighted up. As the result, erroneous control in anti-skid brake control can be perfectly prevented when output characteristics of the sensor of the wheel speed sensor (8) are decreased.

5 Claims, 7 Drawing Sheets

Wheel speed V ($V_L$: Lower limit wheel speed of anti-skid brake control)

FIG. 1(a)

| V | Front wheels | Rear wheels |
|---|---|---|
| Ⓐ | No action taken (normal) | No action taken (normal) |
| Ⓑ | If less than Vb, "select high" | $V_L$ changed to $V_{is}$ |
| Ⓒ | ① Anti-skid brake control suspended<br>② Alarm lamp lighted up<br>(Select high control if appropriate.) | ① Anti-skid brake control suspended<br>② Alarm lamp lighted up |

($V_{is}$: Start-up speed)

FIG. 7

METHOD FOR ANTI-SKID BRAKE CONTROL

BACKGROUND OF THE INVENTION

The present invention relates to a method for anti-skid brake control for controlling braking force by adjusting braking force of a wheel when the wheel is tend to be locked and by eliminating the locking tendency, and in particular to a method for anti-skid brake control in case a wheel speed sensor for detecting wheel speed is not normally operated.

In anti-skid brake control, brake control is performed, when it is detected that a wheel is in skid tendency during braking, to stabilize driving of a vehicle and to make braking distance as short as possible by lowering braking force of the wheel and by eliminating skid tendency, and by increasing braking force again thereafter.

In the past, an anti-skid brake control unit with the anti-skid brake control applied on a vehicle braking device based on pneumatic pressure has been proposed, for example, in Japanese Patent Laid-Open Publication 50-96773.

Figure 5:
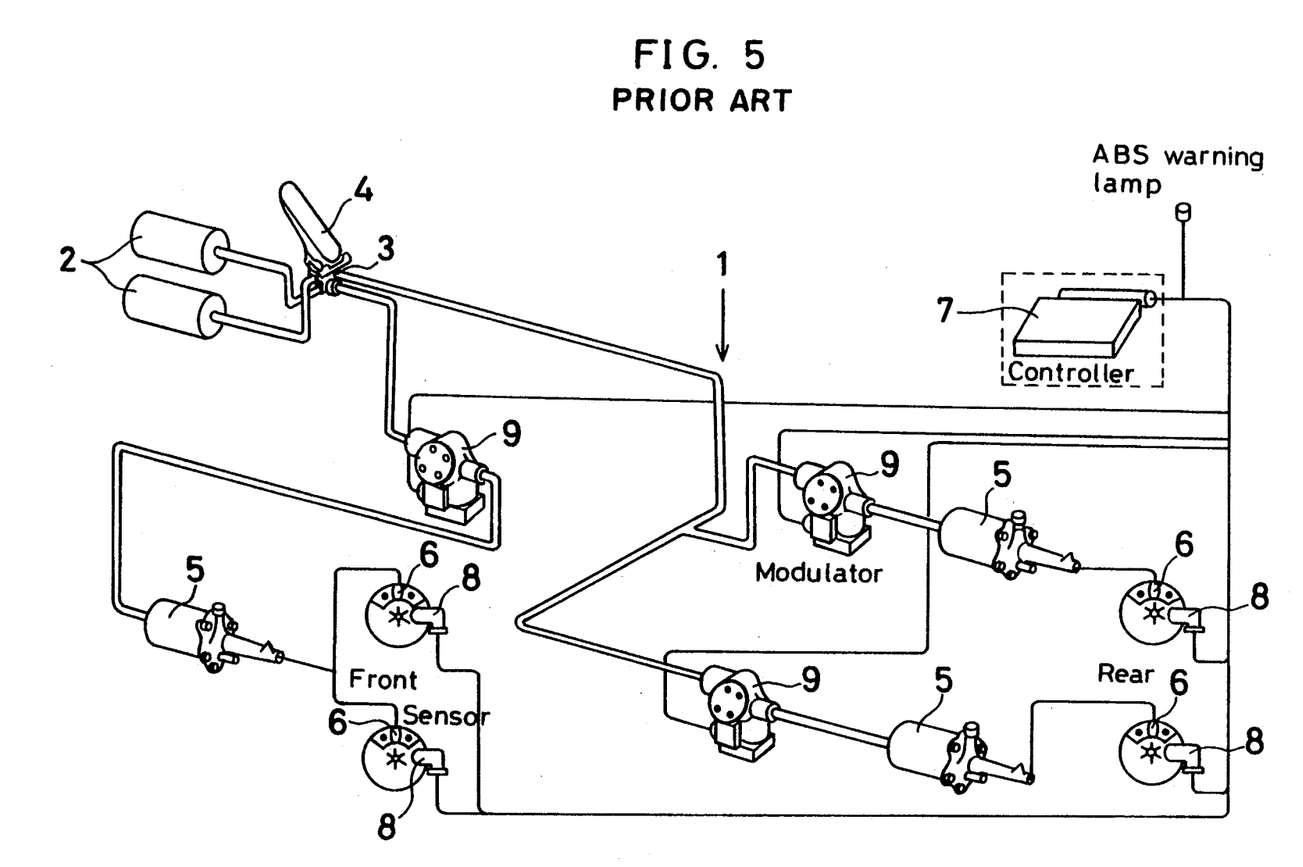
FIG. 5 shows a conventional example of an air over hydraulic brake device equipped with an anti skid brake control unit.

FIG. 5 schematically shows a common example of a vehicle braking device equipped with a conventional type anti-skid brake control unit.

As shown in FIG. 5, the vehicle braking device 1 comprises an air tank 2 for accommodating compressed air, a brake valve 3 for controlling supply and discharge of compressed air to and from the air tank 2, a brake pedal 4 for controlling the brake valve 3, a brake booster 5 for generating braking hydraulic pressure by pressure of compressed air sent through the brake valve 3, a brake cylinder 6 for braking wheels by introducing hydraulic pressure converted by the brake booster 5, a controller 7 for performing anti-skid brake control, a wheel speed sensor 8 for detecting wheel speed and sending signal to the controller 7, and a modulator 9 for supplying, discharging or maintaining compressed air to and from the brake booster 5 by operating according to control signal sent from the controller 7 and for adjusting pneumatic pressure introduced into the brake booster 5.

By treading the brake pedal 4 and by operating the brake valve 3 during braking operation, output pressure of the brake valve 3 is supplied to the modulator 9. As the result, an opening valve (not shown) for holding of the modulator 9 is opened, and output pressure of the brake valve 3 is supplied to the brake booster 5, which generates braking hydraulic pressure. The braking hydraulic pressure generated at the brake booster 5 is introduced into the brake cylinder 6, which in turn operates the brake.

When the controller 7 judges during braking that a wheel is in locking tendency based on wheel speed sinal from the wheel speed sensor 8, the controller 7 operates a holding solenoid valve (not shown) of the modulator 9, which corresponds to the wheel in locking tendency.

As the result, a holding opening valve (not shown) is closed, and the brake is set to holding state. However, if locking tendency is not eliminated yet, an exhaust solenoid valve (not shown) of the modulator 9 is operated. Then, an exhaust opening valve is opened, and compressed air supplied to the brake booster 5 is discharged, and it leads to brake decompression state.

When locking tendency of the wheel is eliminated, the holding solenoid valve and the exhaust solenoid valve are returned to non-operating state. The exhaust opening valve is closed, and the holding opening valve is opened. Thus, it leads to brake pressurization state.

In this way, when the controller 7 calculates from the wheel speed sensor 8 and judges that the wheel is in locking tendency based on wheel speed, the holding solenoid valve and the exhaust solenoid valve of the modulator 9 are operated according to control signal from the controller 7. To the pneumatic pressure supplied from the brake booster 5, decompression, holding or pressurization are repeatedly controlled, and anti-skid brake control is performed to eliminate the locking tendency of the wheel.

The wheel speed sensor 8 in the anti-skid brake control of the vehicle braking device 1 generally comprises a sensor rotor $8b$ having a plurality of projections $8a$ integrally rotating with the wheel and a sensor $8c$, which senses these projections and generates output. In this case, the gap between the sensor rotor $8b$ and the sensor $8c$ is adjusted approximately to 0 in a new vehicle.

Figure 6:
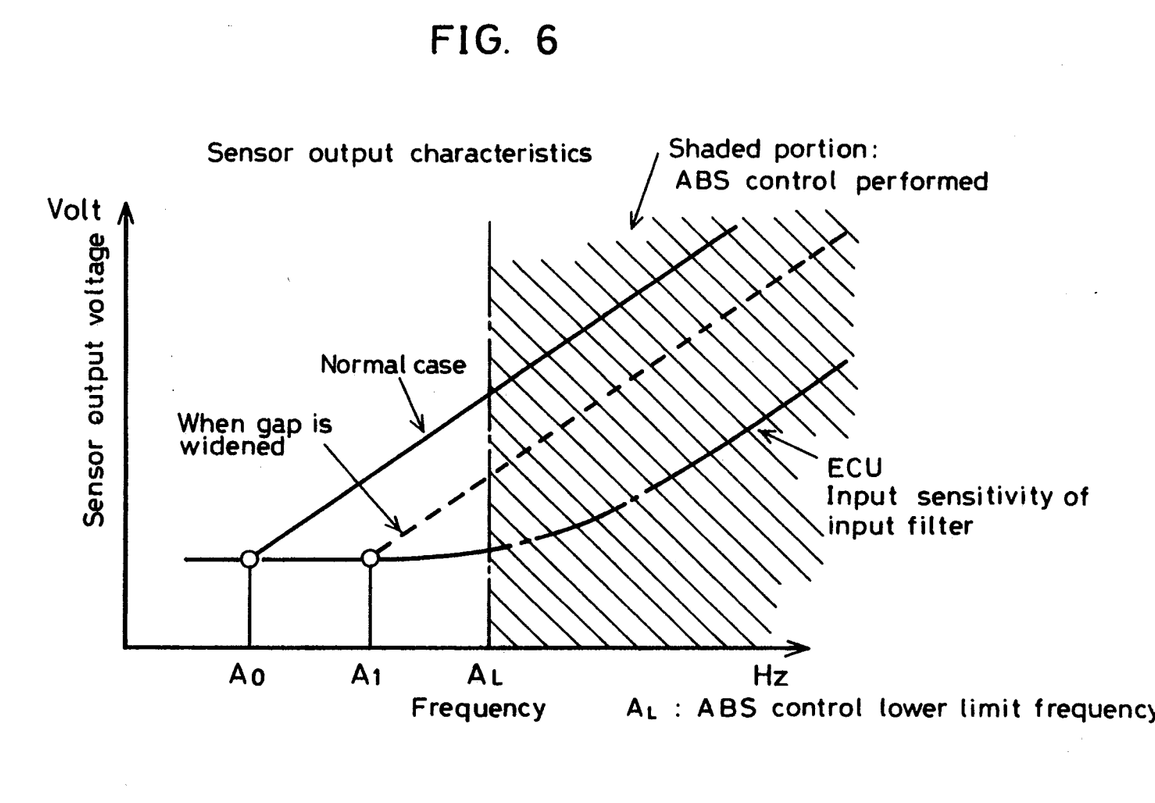
FIG. 6 represents a diagram for explaining that sensor output characteristics of the wheel speed sensor are decreased by the gap between sensor rotor and sensor of the wheel speed sensor.

On sensor signal inlet of the controller 7, an input filter (not shown) such as low pass filter is mounted to remove noise. Thus, the wheel speed signal from the wheel speed sensor 8 is removed of noise and is received by the controller 7. In case the input filter is provided in this way, sensor output characteristics of the sensor have frequency of $A_0$ Hz or more as shown in FIG. 6 when the sensor is normal because of input sensitivity of the input filter. That is, the controller 7 begins to sense sensor output signal.

However, when the gap between the sensor rotor $8b$ and the sensor $8c$ is widened due to wearing, output voltage of the sensor $8c$ decreases. As the result, the frequency to start generation of sensor output voltage decreases to $A_1$ Hz along input sensitivity line of input filter as shown by one-dot chain line. When the gap between the sensor rotor $8b$ and the sensor $8c$ is further widened and the frequency to start generation of sensor output voltage goes above the lower limit frequency $A_L$ (the frequency, at which anti-skid brake control is stopped if the sensor frequency approximately equal to wheel speed goes down below this frequency) of anti-skid brake control. Then, the controller 7 judges erroneously that the wheel is locked.

Figure 7:
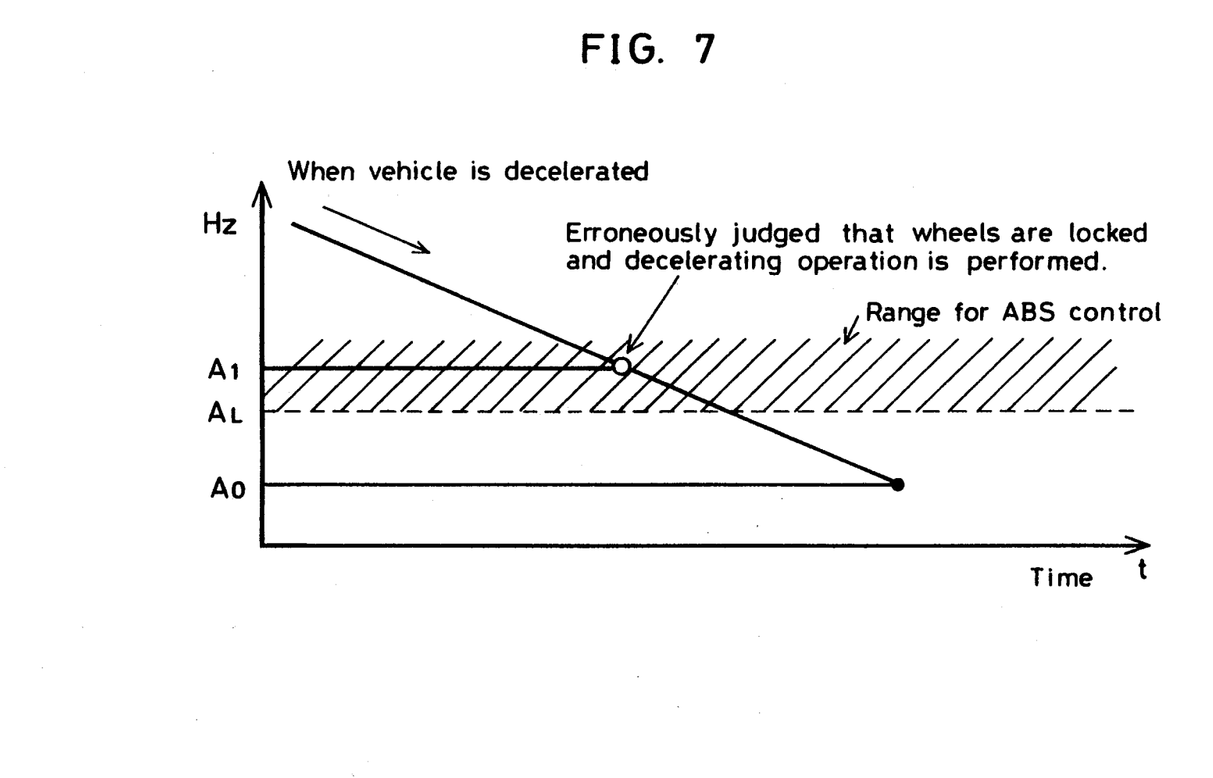
FIG. 7 is a diagram for explaining that anti-skid brake control is erroneously carried out when sensor output characteristics are decreased.

Possible cause for this erroneous judgment is as follows: As shown in FIG. 7, when braking is performed and wheel speed decreases under the condition where the frequency to start generation of sensor output voltage is above the lower limit frequency $A_L$ of anti-skid brake control, output voltage of the sensor is turned to 0 if output frequency of the sensor is below the frequency to start generation of sensor output voltage. Because the frequency to start generation of sensor output voltage is within the range to execute anti-skid brake control, the controller 7 erroneously judges that the wheel is locked because sensor output voltage is turned to 0.

When the controller 7 erroneously judges, exhaust signal is outputted to the modulator 9 so that exhaust operation for decompression of brake pressure is performed in anti-skid brake control, and the modulator 9 erroneously carries out exhaust operation. As the result, stopping distance is extended when the vehicle is braked, and this leads to poor driving performance.

SUMMARY OF THE INVENTION

It is an object of the present invention to provide a method for anti-skid brake control to perfectly prevent erroneous anti-skid brake control when the gap between a sensor rotor and a sensor in a wheel speed sensor is widened and sensor output characteristics are decreased.

To attain the above object, the method for anti-skid brake control according to the present invention is to adjust braking force, when a wheel is judged to be in locking tendency, to eliminate the locking tendency of at least this particular wheel by judging locking of the wheel during braking based on wheel speed when wheel speed from wheel speed sensor is higher than lower limit speed of antiskid brake control, at which anti-skid brake control is started, whereby a first reference speed higher than said lower limit speed of anti-skid brake control is set, start-up wheel speed rapidly increasing is detected by said wheel speed sensor when wheel speed gradually increases at the starting of the vehicle, it is judged that said wheel speed sensor is not normal (i.e., defective) when said start-up wheel speed is higher than said first reference speed, and a predetermined action is taken to prevent erroneous control of anti-skid brake control when said wheel speed sensor is not normal.

The method according to the present invention is also characterized in that, when said start-up wheel speed is higher than a second reference speed, which is higher than said first reference speed, and anti-skid brake control is prohibited in order to prevent erroneous control of said anti-skid brake control.

Further, the method according to the present invention is characterized in that, when front wheels are not driving wheels and rear wheels are driving wheels and anti-skid brake control is performed with at least front wheels at "select low" of left and right wheel speeds in normal case, and if start-up wheel speeds of said front wheels are higher than said first reference speed and lower than said second reference speed, anti-skid brake control is performed by "select high" of left and right wheel speeds of said front wheels in order to prevent erroneous control of said anti-skid brake control, and when start-up wheel speeds of said rear wheels are higher than said first reference speed and lower than said second reference speed, lower limit wheel speed of anti-skid brake control in anti-skid brake control of said rear wheels is changed to start-up wheel speeds of rear wheels at this moment in order to prevent erroneous control of said anti-skid brake control.

In the method for anti-skid brake control with the above arrangement, when wheel speed is gradually increased at the starting of the vehicle and start-up wheel speed during rapid increase is detected by the wheel speed sensor and if this start-up wheel speed is higher than a first reference speed, it is judged that the wheel speed sensor is not normal. That is, the gap between the sensor and the sensor rotor in the wheel speed sensor is widened to such degree that erroneous control of anti-skid brake control may occur.

When it is judged that the wheel speed sensor is not normal, a predetermined action is taken to prevent erroneous control of anti-skid brake control. Therefore, when the gap between the sensor and the sensor rotor in the wheel speed sensor is widened, erroneous control of anti-skid brake control can be perfectly prevented.

According to the present invention, when start-up wheel speed from the wheel speed sensor is higher than a second reference speed, which is higher than the first reference speed, anti-skid brake control is prohibited in order to prevent erroneous control of anti-skid brake control. Therefore, when the gap between the sensor and the sensor rotor in the wheel speed sensor is abnormally big, anti-skid brake control is not performed, and erroneous control can be perfectly prevented.

According to the present invention, when anti-skid brake control is performed with front wheels at "select low" of left and right wheel speeds in normal case, and if start-up wheel speeds of the front wheels are higher than said first reference speed and lower than the second reference speed, anti-skid brake control is performed by "select high" of left and right wheel speeds of the front wheels to the front wheels in order to prevent erroneous control of anti-skid brake control. Because higher speed is selected from wheel speeds of left and right front wheels, the gap between the sensor and the sensor rotor in the wheel speed sensor is widened and sensor output voltage decreases, and this prevents erroneous anti-skid brake control despite of the fact that the wheels are not actually in locking tendency.

Also, when start-up wheel speeds of rear wheels are higher than the first reference speed and lower than the second reference speed, lower limit wheel speed in anti-skid brake control of rear wheels is changed to start-up wheel speeds of rear wheels at this moment in order to prevent erroneous control of anti-skid brake control. This increases the lower limit wheel speed of anti-skid brake control, and when the gap between the sensor and the sensor rotor in the wheel speed sensor is widened and sensor output voltage decreases as in the case of front wheels described above, erroneous anti-skid brake control is prevented although the wheels are actually not in locking tendency.

Thus, the extension of stopping distance when the vehicle is braked can be avoided, and this improves the driving performance of the anti-skid brake control device.

Still other objects and advantages of the invention will in part be obvious and will in part be apparent from the specification. The invention accordingly comprises the features of construction, combination of elements, and arrangement of parts which will be exemplified in the construction hereinafter set forth, and the scope of the invention will be indicated in the claims.

DESCRIPTION OF THE PREFERRED EMBODIMENTS

In the following, description will be given on embodiments of the present invention.

Figure 1A:
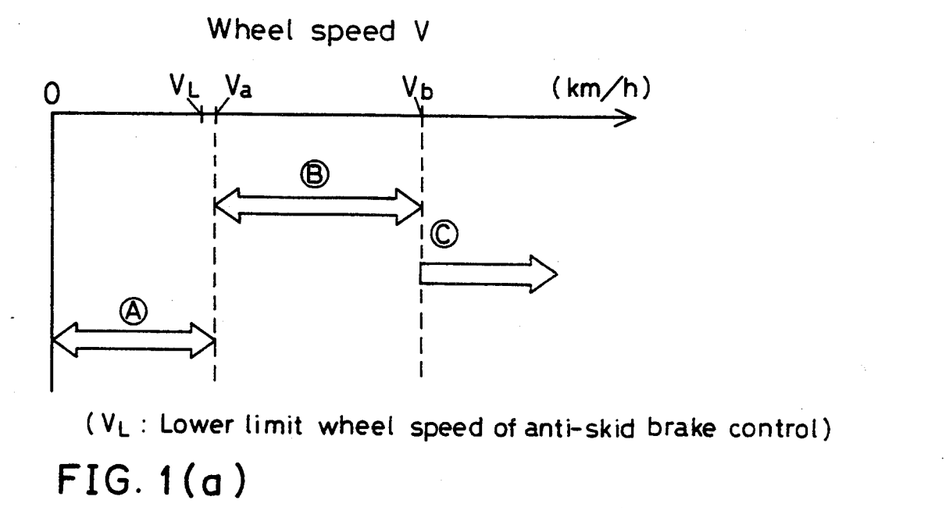
FIGS. 1(a) and 1(b) are drawings for explaining an embodiment of the method for anti-skid brake control of the present invention.
Figure 1B:
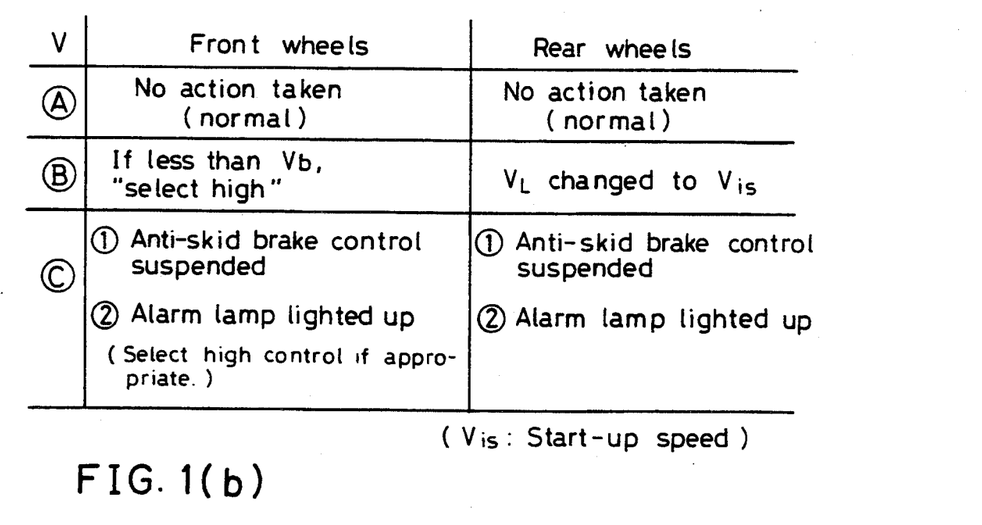

FIGS. 1(a) and 1(b) show an embodiment of a method for anti-skid brake control of the present invention. FIGS. 1(a) and 1(b) represent a case where the present embodiment is applied to an antiskid brake control unit as shown in FIG. 5, i.e. an antiskid brake control unit, in which left and right front wheels are controlled by a single modulator and left and right rear wheels are controlled by separate modulators.

In the embodiment as shown in FIGS. 1(a) and 1(b), when wheel speed is gradually increased from 0 during starting of the vehicle, output generation starting frequency Ais of the wheel speed sensor 8, i.e. start-up wheel speed Vis during rapid increase from 0, is detected. Next, if the start-up wheel speed Vis detected by the wheel speed sensor 8 is higher than a predetermined value, it is judged that the wheel speed sensor 8 is not normal. If the start-up wheel speed Vis detected by the wheel speed sensor 8 is lower than the predetermined value, it is judged that the wheel speed sensor 8 is normal. This predetermined value is set to a value slightly higher than the lower limit speed value of anti-skid brake control, at which anti-skid brake control is started. The above judgment is not performed when the start-up wheel speed Vis is higher than vehicle speed. The vehicle speed is calculated from the wheel speed of front wheels, which are non-driving wheels, in order to prevent erroneous judgment due to slip, noise, etc. of the wheels on road with low friction coefficient (hereinafter referred as "low $\mu$ road").

Further, in the present embodiment, the following procedure is taken if it is judged that the wheel speed sensor 8 is not normal. First, when output generation starting frequency Ais of the wheel speed sensor 8 is higher than a first preset frequency Aa and lower than a second preset frequency Ab, i.e. when the start-up wheel speed Vis detected by the wheel speed sensor 8 is higher than a first reference speed Va (the first preset frequency Aa) and lower than a second reference speed Vb (corresponding to the second preset frequency Ab), and if the wheel speed sensor 8 judged as not normal is on front wheel side, "select low" control on front wheel side is switched over to "select high" control.

If the wheel speed sensor 8 judged as abnormal is on rear wheel side, lower limit frequency $A_L$ of anti-skid brake control is increased to higher than the output generation starting frequency Ais of the wheel speed sensor 8. ($A_L \geq$ Ais; for the corresponding lower limit wheel speed of anti-skid brake control: $V_L \geq$ Vis). Actually, the output generation starting frequency Ais of the wheel speed sensor 8 on rear wheel side is set as lower limit Frequency An of anti-skid brake control on rear wheel side. ($A_L \leftarrow$ Ais; for the corresponding lower limit wheel speed of anti-skid brake control: $V_L \rightarrow$ Vis)

Next, when the output generation starting frequency Ais of the wheel speed sensor 8 is higher than the second preset frequency Ab, i.e. when the start-up wheel speed Vis detected by the wheel speed sensor 8 is higher than the second reference speed Vb, anti-skid brake control is prohibited for both front wheel and rear wheel sides, and alarm lamp is lighted up to notify that the wheel speed sensor 8 is not normal. In this case, anti-skid brake control by "select high" may be continued for front wheel side.

When the output generation starting frequency Ais of the wheel speed sensor 8 is lower than the first preset frequency Aa, i.e. the start-up wheel speed Vis detected by the wheel speed sensor 8 is lower than the first reference speed Va, it is judged that the wheel speed sensor 8 is normal, and no further action is taken.

Figure 2:
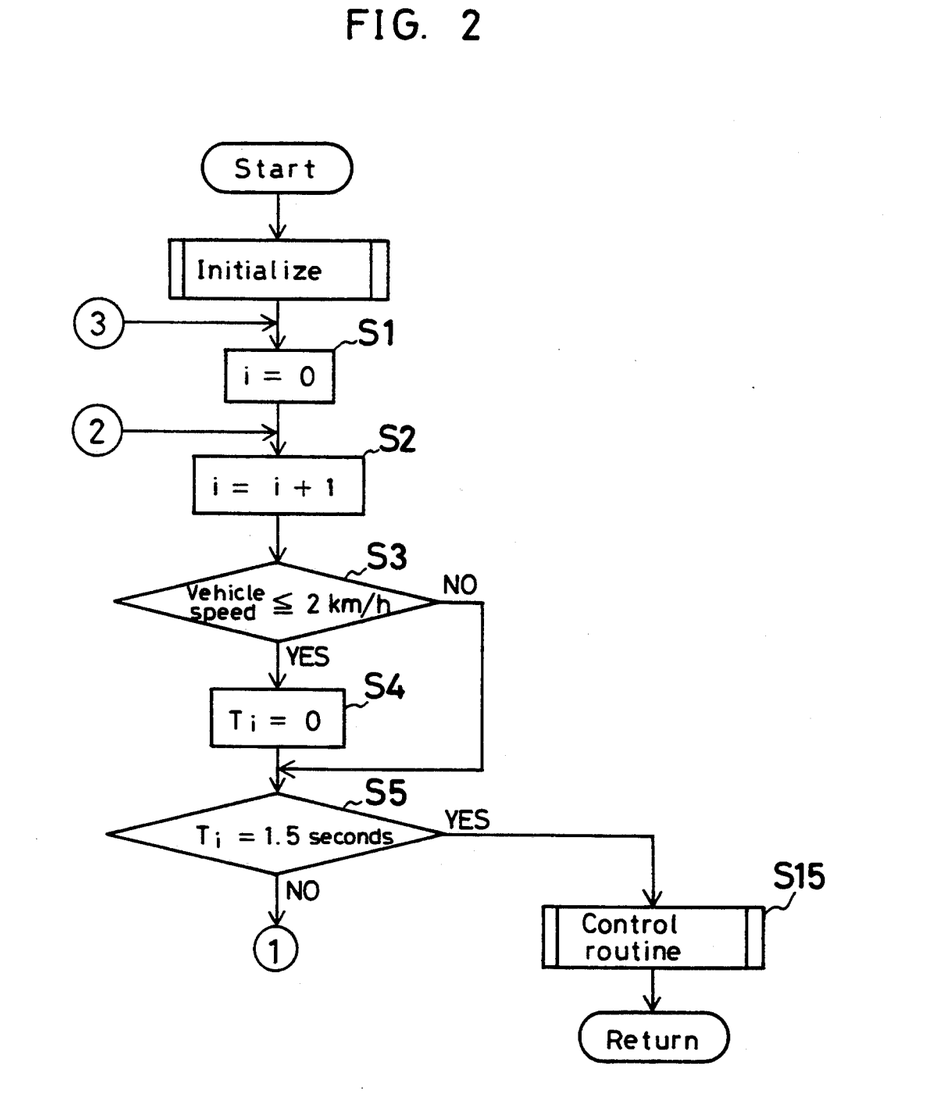
FIG. 2 shows first half of a flow of detection of start-up wheel speed Vis.
Figure 3:
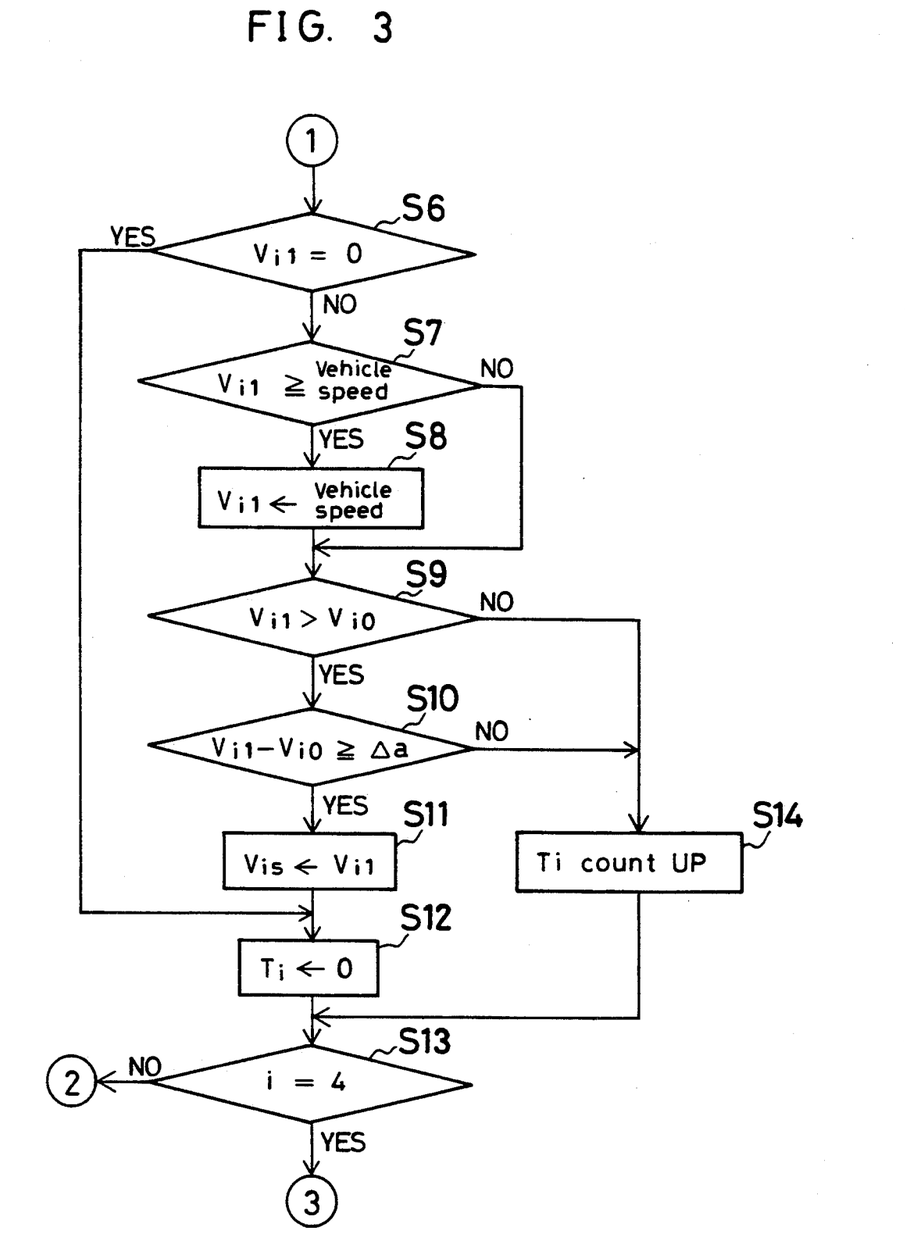
FIG. 3 shows latter half of a flow of detection of start-up wheel speed Vis.
Figure 4:
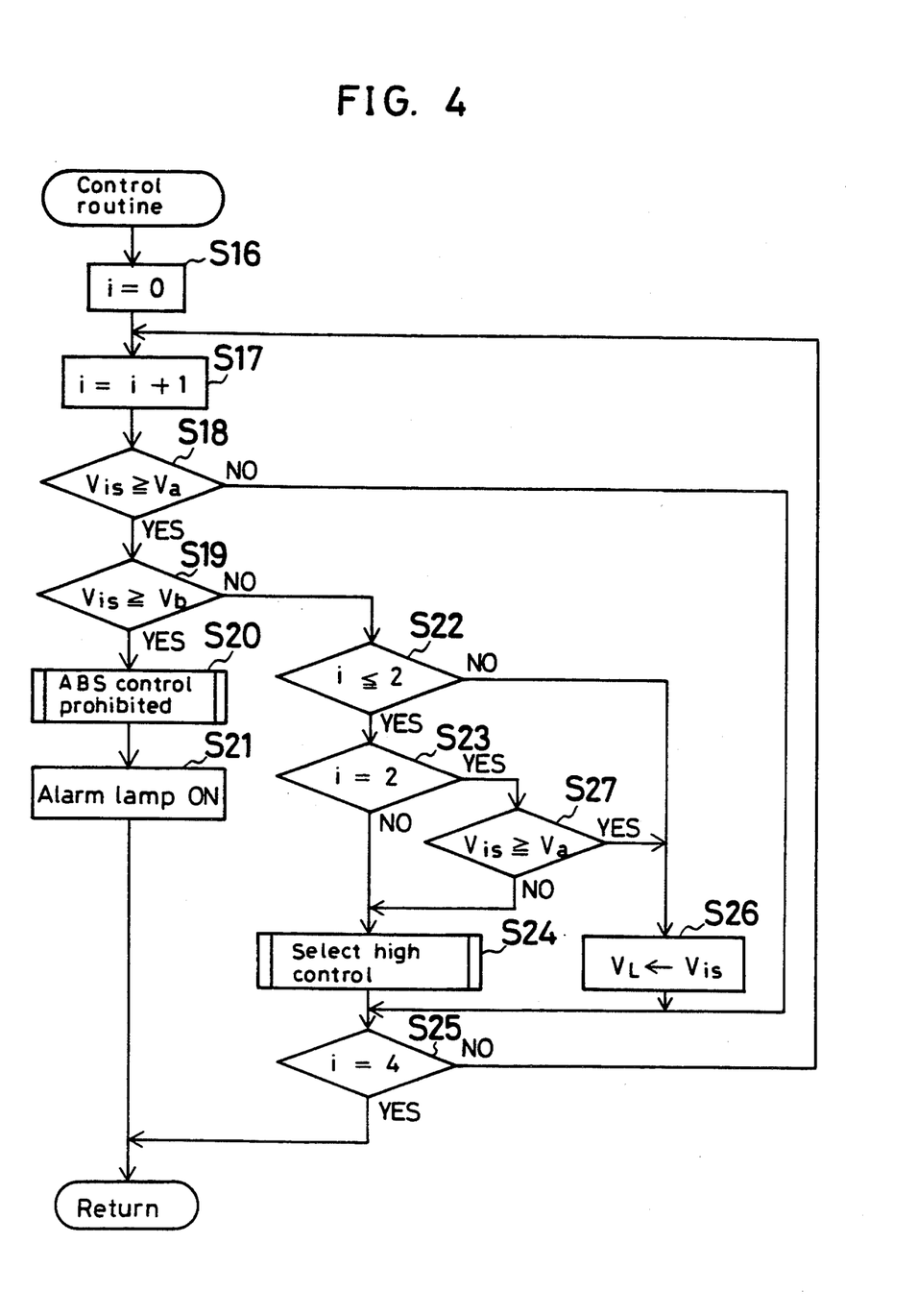
FIG. 4 represents a flow of a procedure taken when a wheel speed sensor is not normal.

Next, description will be given on the method for antiskid brake control of the present embodiment, referring to FIG. 2 and FIG. 3 showing flows of detection of the start-up wheel speed Vis and to FIG. 4 showing a flow for the procedure in case the wheel speed sensor is not normal.

In FIG. 2, i=1 and i=2 are left and right front wheels, i=3 and i=4 are left and right rear wheels, Vi1 is the current wheel speed, Vi0 is previous wheel speed, $\Delta$a is a reference for judging start-up wheel speed, Vis is start-up wheel speed, and $V_L$ is lower limit wheel speed of anti-skid brake control. In this flow chart, start-up wheel speed Vis is detected for each of front, rear, left and right wheels for every 10 ms. The start-up wheel speed Vis is detected for 1.5 seconds from the start of driving.

After starting and initializing, it is set to i=0 in Step S1, and it is set to i=i+1 in Step S2. That is, start-up wheel speed Vis is detected for left front wheel. Then, in Step S3, it is judged whether the vehicle speed is 2 km/h or less, i.e. if wheel speed $\leq$2 km/h or not. The vehicle speed is calculated based on "select high" of wheel speed of front wheels, which are non-driving wheels.

When the vehicle speed is judged to be 2 km/h or less in Step S3, the time is set to Ti=0 in Step S4, and it is judged in Step S5 whether the time Ti has elapsed by 1.5 seconds, i.e. whether Ti=1.5 seconds or not. If it is judged that the time Ti has not elapsed by 1.5 seconds, it is judged in Step S6 of FIG. 3 that the current wheel speed Vi1 is 0 or not. If it is judged that Vi1 is not 0, it is judged in Step S7 whether Vi1 is higher than vehicle speed or not, i.e. whether Vi1$\leq$vehicle speed or not. If it is judged that Vi1 is higher than vehicle speed, the current wheel speed Vi1 is set to the vehicle speed in Step S8. As the result, it is possible to prevent erroneous judgment due to slip, noise, etc. of the wheels on low $\mu$ road.

Next, it is judged in Step S9 whether the current wheel speed Vi1 is higher than previous wheel speed Vi0 or not, i.e. whether Vi1>Vi0 or not. Thus, it is judged whether the vehicle is in accelerating state or not. If it is judged that Vi1 is higher than Vi0, i.e. that the vehicle is in accelerating state, it is judged in Step S10 whether the difference between Vi1 and Vi0 is higher than a reference value $\Delta$a for judging start-up wheel speed or not, i.e. whether Vi1$-$Vi0$\leq\Delta$a or not. If it is judged that the difference between Vi1 and Vi0 is higher than the reference value $\Delta$a for judging start-up wheel speed, the start-up wheel speed Vis is set to this Vi1 value in Step S11. That is, the start-up wheel speed Vis is detected. Next, after the time Ti is set to 0 in Step S12, it is judged in Step S13 whether i is 4 or not, i.e. i=4 or not. If it is judged that i is not 4, the procedure is returned to Step S2. If it is judged that i is 4, it is returned to Step S1.

When it is judged in Step S10 that the difference between Vi1 and Vi0 is not higher than the reference value $\Delta$a for judging start-up wheel speed, count value for the time Ti is graded up in Step S14, and it is shifted to Step S13. If it is judged in Step S7 that Vi1 is not higher than vehicle speed, it is shifted to Step S9. Further, if it is judged in Step S6 that Vi1=0, it is shifted to Step S12. Further, if it is judged in Step S5 of FIG. 2 that the time Ti has elapsed by 1.5 seconds, it is shifted in Step S15 to the control routine when wheel speed sensor 8 is not normal based on the processing flow of FIG. 4. Further, if it is judged in Step S3 that vehicle speed is not less than 2 km/h, it is shifted to Step S5.

In FIG. 3, if it is judged in Step S13 that i is not 4, it is returned to Step S2, and i=i+1 in Step S2. That is, the start-up wheel speed Vis is detected for right front wheel. Then, similar processing is performed according to the same flow. When the detection of the start-up wheel speed Vis for right front wheel has been completed, and it is judged in Step S13 that i is not yet 4, it is returned to Step S2 again, and the start-up wheel speed Vis for left rear wheel is detected. When the detection of start-up wheel speed Vis for left rear wheel has been completed, start-up wheel speed Vis for right rear wheel is detected. Thus, start-up wheel speeds Vis are detected for all four wheels of front and rear, left and right.

On the other hand, if it is judged in Step S13 that i is 4, it is returned to Step S1, and i=0 in Step S1. That is, start-up wheel speed Vis for front, rear, left and right wheels is newly detected.

As shown in FIG. 4, in control routine when the wheel speed sensor 8 is not normal, it is made that i=0 in Step S16, and it is made that i=i+1 in Step S17. It is judged in Step S18 whether the start-up wheel speed Vis is higher than the first reference speed Va or not, i.e. whether Vis≧Va or not. If it is judged that Vis is higher than the first reference speed, it is judged in Step S19 whether the start-up wheel speed Vis is higher than the second reference speed Vb or not, i.e. whether Vis≧Vb or not. If it is judged that Vis is higher than the second reference speed Vb, anti-skid brake control for left front wheel is prohibited in Step S20, and alarm lamp is lighted up in Step S21. In the present embodiment, anti-skid brake control of front wheels is performed commonly for left and right wheels by a single modulator, and anti-skid brake control for right front wheel is also prohibited.

When it is judged in Step S19 that Vis is not higher than the second reference speed Vb, it is judged in Step S22 whether i is 2 or less or not, i.e. whether i≦2 or not. If it is judged that i is 2 or less, it is judged in Step S23 whether i is 2 or not, i.e. whether i=2 or not. If it is judged that i is not 2, anti-skid brake control for left front wheel is switched over to "select high" control in Step S24. As in Step S20 described above, anti-skid brake control for front wheels is performed commonly for left and right wheels by a single modulator, and right front wheel is also switched over to "select high" control. Then, it is judged in Step S29 whether i is 4 or not. If it is judged that i is not 4, it is returned to Step S17. If it is judged that i is 4, the processing of control routine is completed, and the start-up wheel speed Vis is newly detected.

When it is judged in Step S22 that i is not 2 or less, it is judged that the current processing is being performed for rear wheels. In this case, the current start-up wheel speed Vis is set to lower wheel speed $V_L$ of anti-skid brake control, and it is then shifted to Step S25. If it is judged in Step S18 that Vis is not higher than the first reference speed Va, it is shifted to Step S25.

When it is judged in Step S23 that i is 2, it is judged in Step S27 whether the start-up wheel speed Vis of left front wheel is higher than the first reference speed Va or not, i.e. whether Vis≧Va or not. If it is judged that Vis is higher than the first reference speed Va, the current start-up wheel speed Vis is set to lower limit wheel speed $V_L$ of anti-skid brake control in Step S26, and it is then shifted to Step S25. That is, when start-up speeds Vis of both of left and right front wheels are higher than the first reference speed Va, the lower limit wheel speed $V_L$ of anti-skid brake control is set to the current startup wheel speed Vis.

When it is judged in Step S27 that Vis is not higher than the first reference speed Va, it is switched over to "select high" control in Step S24, and it is shifted to Step S25.

When it is judged in Step S25 that i is not 4 and it is returned to Step S17, it is increased by 1 in Step S17. That is, when the wheel speed sensor 8 is not normal, the processing is performed for right front wheel. In the present embodiment, anti-skid brake control is performed commonly for left and right wheels of front wheels by a single modulator. Thus, control processing in Steps S20 and S24 is performed commonly for left and right front wheels.

Similarly, it is increased by 1 in Step S17, and successive processings are performed for left and right of rear wheels, In the above embodiment, anti-skid brake control for front wheels is commonly performed for left and right wheels by a single modulator, whereas the present invention can be applied for the case where anti-skid brake control for front wheels is performed separately as in the case of rear wheels. It can also be applied to the case where anti-skid brake control for rear wheels is commonly performed for left and right wheels by a single modulator.

In the above embodiment, description has been given on the case where pneumatic pressure is converted to fluid pressure by the brake booster to perform braking operation, whereas the present invention can be applied to the case where compressed air is supplied to an air brake chamber and braking operation is performed by air pressure, or the case where braking operation is performed by fluid pressure.

Further, in the above embodiment, the modulator used is of such type that pneumatic pressure to the brake booster is directly controlled, whereas the present invention can also be applied to the case where the modulator is provided with a relay valve, and output pneumatic pressure of the brake valve is used as indicating pressure, compressed air of air tank is controlled and supplied to the brake booster, and indicating pressure of the relay valve is controlled.

As it is evident from the above description, it is possible according to the method for anti-skid brake control of the present invention to perfectly prevent erroneous control of anti-skid brake control when the gap between sensor rotor and sensor of the wheel speed sensor is widened and sensor output characteristics of the sensor decreases. As the result, it is possible to prevent extension of stopping distance when the vehicle is braked by erroneous anti-skid brake control and to improve operability of antiskid brake control unit.

What we claim is:

1. A method for anti-skid brake control comprising:
   detecting a wheel speed by a wheel speed sensor,
   comparing the detected wheel speed with an anti-skid brake control lower limit speed at which anti-skid brake control is initiated, determining locking of the wheel on the basis of said wheel speed when said detected wheel speed is higher than said anti-skid brake control lower limit speed, and controlling, when it is determined that said wheel is showing a tendency to lock, braking force for at least said wheel so that the locking tendency is cancelled, said method additionally comprising determining whether said wheel sensor is defective by the steps of:

setting a first reference speed which is higher than said anti-skid brake control lower limit speed, detecting a start-up wheel speed by said wheel speed sensor when the wheel speed gradually increases during starting of a vehicle, comparing said start-up wheel speed with said first reference speed, and determining said wheel speed sensor is defective, when said start-up wheel speed is higher than said first reference speed, and said method further comprising:

modifying said anti-skid control, when said start-up wheel speed is higher than said first reference speed, by at least one of suspending said anti-skid brake control and performing anti-skid brake control for front wheels of said vehicle by using a highest wheel speed of said front wheels.

2. A method for anti-skid brake control according to claim 1, further comprising:

setting a second reference speed which is higher than said first reference, comparing said start-up wheel speed with said second reference speed, and when said start-up wheel speed is higher than said second reference speed, suspending said anti-skid brake control.

3. A method for anti-skid brake control comprising:

detecting a wheel speed by a wheel speed sensor, comparing the detected wheel speed with an anti-skid brake control lower limit speed at which anti-skid brake control is initiated, determining locking of the wheel on the basis of, said wheel speed when said wheel speed is higher than said anti-skid brake control lower limit speed, and controlling, when it is determined that said wheel is showing a tendency to lock, braking force for at least said wheel so that the locking tendency is cancelled, said method additionally comprising determining whether said wheel sensor is defective by the steps of:

setting a first reference speed which is higher than said anti-skid brake control lower limit speed, detecting a start-up wheel speed of rear wheels by said wheel speed sensor when the wheel speed gradually increases during starting of a vehicle, comparing said start-up wheel speed with said first reference speed, and determining said wheel speed sensor is defective, when said start-up wheel speed is higher than said first reference speed, and said method further comprising:

modifying said anti-skid brake control by changing said anti-skid brake control lower limit speed to said start-up wheel speed, when said start-up wheel speed is higher than said first reference speed.

4. A method for anti-skid brake control according to claim 3, further comprising:

setting a second reference speed which is higher than said first reference, comparing said start-up speed with said second reference speed, and when said start-up speed is higher that said second reference speed, suspending said anti-skid brake control.

5. A method for anti-skid brake control performed in a vehicle having non-driving front wheels and driving rear wheels comprising:

detecting wheel speeds for said front and rear wheels of a vehicle by a respective wheel speed sensor therefor, comparing the detected wheel speeds with an anti-skid brake control lower limit speed at which anti-skid brake control is initiated, determining locking of any one of said wheels on the basis of said wheel speeds when at least one of said wheel speeds is higher than said anti-skid brake control lower limit speed, and controlling, when it is determined that said at least one wheel is showing a tendency to lock, braking force for said at least one wheel so that the locking tendency is cancelled, said method additionally comprising determining whether any one of said wheel sensors is defective by the steps off setting a first reference speed which is higher than said anti-skid brake control lower limit speed and a second reference speed higher than said first reference speed representing an abnormal sensor, detecting start-up wheel speeds by each said wheel speed sensor when said wheel speeds gradually increase during starting of said vehicle, comparing said start-up wheel speeds with said first reference speed, and determining any one of said wheel speed sensors is defective when any one of said start-up wheel speeds is higher than said first reference speed, and said method further comprising:

controlling said anti-skid brake control as follows:

(1) when one of said front wheel start-up speeds is higher than said first reference speed and lower than said second reference speed, performing said anti-skid brake control by selecting a highest wheel speed of left and right front wheels speeds for executing anti-skid brake control, (2) when one of said front wheel start-up speeds is higher than said second reference speed, suspending said anti-skid brake control, (3) when one of said rear wheel start-up speeds is higher said first reference speed and lower than said second reference speed, changing said anti-skid brake control lower limit speed to said one of said rear wheel startup speeds, and (4) when one of said rear wheel start-up speeds is higher than said second reference speed, suspending said anti-skid brake control.

* * * * *